United States Patent Office 2,798,866
Patented July 9, 1957

2,798,866

STEPWISE POLYMERIZATION OF DRIPOLENE FRACTIONS

Leon B. Gordon, Texas City, and Francis T. Wadsworth, Dickinson, Tex., assignors, by mesne assignments, to The American Oil Company No Drawing. Application October 20, 1953, Serial No. 387,296

4 Claims. (Cl. 260—82)

This invention relates to synthetic resins and particularly to synthetic hydrocarbon resins. More specifically, our invention relates to the production of synthetic hydrocarbon resins from a mixture of unsaturated hydrocarbons, commonly known as "dripolene," obtained in the high-temperature pyrolysis of normally gaseous hydrocarbons.

A well-known raw material for the production of hydrocarbon resins is the complex mixture of unsaturated hydrocarbons produced by subjecting normally gaseous hydrocarbons to pyrolysis at elevated temperatures of 1300° F. or higher. At such temperatures, the hydrocarbons undergo a complex group of reactions, and are converted into a heterogeneous mixture which includes olefins, diolefins, cycloolefins, aromatics, and other constituents of diverse physical and chemical properties. This mixture is commonly designated as "dripolene" in the art. The catalytic polymerization of dripolene or similar charging stocks has heretofore been carried out by a one-stage treatment of the dripolene or a fraction thereof in the presence of aluminum chloride, complexes of aluminum chloride, boron trifluoride, and the like. The resulting resins were found to be useful in a number of large-scale applications, but were in general handicapped because of certain shortcomings with respect to color, softening point, indentation characteristics, and the like.

We have now discovered an improved technique for producing resins of superior properties from dripolene. In our new process, dripolene is separated into two or more fractions by fractional distillation, and the fractions are polymerized one after the other with an aluminum chloride catalyst, the total catalyst being contacted first with the fraction of lowest unsaturation, and the successively more unsaturated fractions being thereafter added seriatim to the reaction mixture. In this way, the most difficultly polymerizable material is contacted first with an effectively high proportion of the catalyst in its most active form, and the more readily polymerizable materials are contacted with a lower concentration of catalyst of moderated activity. We have found that this technique not only permits a substantial saving in quantity of catalyst, but also produces a resin of lighter color and improved indentation properties.

It is accordingly an object of our invention to produce a hydrocarbon resin of improved chemical and physical properties. Another object is to prepare a useful resin from dripolene-type mixtures obtained in the pyrolysis of normally gaseous hydrocarbons. A further object is to minimize catalyst requirements in the polymerization of dripolene-type compositions. Another object is to prepare resins especially adapted to use in the fabrication of mastic tiles. These and other objects of our invention will be apparent from the following description thereof.

Dripolene is ordinarily prepared by high-temperature pyrolysis of a normally gaseous hydrocarbon containing two or more carbon atoms in the molecule, or a mixture of such hydrocarbons. The latter hydrocarbons are readily available in the form of natural gases and as by-product gases from the cracking of heavy petroleum oils in the manufacture of gasoline. In the preparation of dripolene, the gaseous hydrocarbon or mixture of hydrocarbons, preferably propane, a mixture of propane and propylene, or a natural gas rich in propanes and/or butanes is pre-heated and passed through an alloy tube in a furnace, where it is exposed at high space velocity to a pyrolysis temperature preferably between about 1350 and 1550° F. at a pressure up to about 100 pounds per square inch, preferably around 5 to 40 pounds per square inch gage. Best yields of liquid products of the dripolene type are realized when the time of exposure to the high temperature is limited to about 0.2 to 5 seconds, around 1 second being preferred.

The hot gases leaving the pyrolysis furnace are quenched with water, oil, or other cooling medium to a temperature below the pyrolysis level, preferably below about 100° F., in order to prevent further pyrolysis, polymerization, or degradation of the reaction product. From the quenching zone, the quenching liquid and a liquid mixture of unsaturated hydrocarbons are withdrawn, the latter being the desired dripolene composition. The dripolene is separated from the quenching liquid by stratification (where the two liquids are immiscible, as from water), or by distillation (as from an absorber oil). The quantity of liquid hydrocarbons produced in this way is ordinarily around 3 percent by weight of the total quantity of gas entering the pyrolysis reactor, the remainder of the gas being converted to hydrocarbons of lower molecular weight, such as ethylene, methane, and hydrogen. A typical specimen of dripolene has the following properties and composition:

ASTM distillation range, °F.:
  Initial _____ 100
  10% _____ 146
  20% _____ 162
  30% _____ 178
  40% _____ 188
  50% _____ 196
  60% _____ 206
  70% _____ 234
  80% _____ 296
  90% _____ 340
  Final _____ 360
Gravity, °API at 60° F_____ 34.7
Bromine number, cg. Br$_2$/g_____ 104.1
Maleic anhydride value, mg. M. A./g_____ 79
Index of refraction, $n_D^{25}$_____ 1.4830
Analysis, volume percent:
  Propane and propylene _____ 0.7
  Isobutane _____ 0.1
  Isobutylene _____ 0.8
  1-butene _____ 0.5
  2-butene _____ 0.6
  n-Butane _____ 0.4
  Butadiene _____ 3.9

Analysis, volume percent—Continued

| | |
|---|---|
| Pentadienes | 7.7 |
| Pentylenes | 6.3 |
| Other C5 | 0.4 |
| Benzene | 34.2 |
| Toluene | 7.8 |
| Xylenes | 1 |
| Styrene | 3 |
| Dicyclopentadiene | 5 |
| Other | 29.6 |

In the preparation of resins according to a preferred embodiment of our invention, we distill from 40 to 60 percent by volume of total dripolene as an overhead fraction, leaving behind the residual material as a distillation bottoms fraction. The said bottoms fraction may also be distilled if desired, suitably under vacuum, prior to being polymerized. Analysis of the said fractions indicates that the bottoms fraction is substantially less unsaturated than the 40 to 60 percent distillate fraction, and is therefore less susceptible to the action of aluminum chloride polymerization catalysts. In accordance with our new technique, the more saturated bottoms fraction is treated first with the entire quantity of polymerization catalyst, followed by addition thereto and polymerization of the more unsaturated 40 to 60 percent distillate fraction. This expedient results in the use of a high concentration of catalyst for polymerizing the more saturated fraction and a lower concentration of less active catalyst for the more reactive unsaturated fraction.

Where the dripolene is divided into more than two fractions, the said fractions are preferably contacted with the polymerization catalyst in the order of increasing unsaturation, as measured by their iodine number. Thus, in every case, the more difficultly polymerizable materials are contacted with a higher concentration of more active catalyst than in the succeeding polymerization step.

In the polymerization steps of our process, we employ a catalyst concentration of at least about 2.5 percent by weight, calculated as AlCl3 and based on the total charging stock, and we prefer to employ the catalyst in a range of between about 2.5 and 5 percent by weight. The catalyst is employed in the form of anhydrous aluminum chloride or a complex thereof with an aromatic hydrocarbon, a ketone, a nitroparaffin, or the like. The entire quantity of catalyst is initially commingled in a jacketed reaction vessel with (ordinarily) the highest-boiling dripolene fraction, and the mixture is agitated at a temperature between about 0 and 100° C., preferably around 20 to 40° C., for 0.5 to 4 hours or longer until the exothermic polymerization reaction is substantially complete. Thereafter, the lower-boiling charging-stock fraction is added, and agitation is continued at a temperature within the same range, with heating or cooling as required, for 0.5 to 4 hours or longer until the entire polymerization reaction has reached the desired degree of completion. The reaction mixture is then neutralized, for example, with aqueous 40 percent sodium hydroxide, and the resin-containing organic layer is separated. The organic layer may be decolorized, if desired, by treatment with sulfuric acid, or with clay, charcoal, silica, activated alumina, or other adsorbent solid. Thereafter, it is subjected to a stripping operation, suitably under vacuum, to remove the lower-boiling constituents, leaving the desired resin behind as a bottoms product.

The polymerization can optionally be carried out in an inert solvent for the final resin, such as a light petroleum naphtha, benzene, toluene, xylenes, isooctane, gasoline, or other aromatic or aliphatic hydrocarbon or mixture thereof. The use of such a solvent is especially desirable if the resin is to be subjected to decolorization, since the reaction product may be too viscous for convenient treatment in undiluted form with the decolorizing agent. The solvent is conveniently employed in a ratio between about 0.25 and 5 volumes per volume of total charging stock.

The greater part of the solvent can readily be removed from the polymerization product by distillation, the residual portion being removed in the final stripping of the resin.

In one embodiment of our invention, total dripolene or dripolene distillate is subjected to a preliminary heat treatment at a temperature between about 350 and 650° F. in the absence of a catalyst for a period of 5 to 30 minutes or more. Thereafter, the dripolene is separated into fractions by distillation, and the said fractions are subjected to stepwise polymerization under the conditions described hereinabove. A resin of lighter color and of otherwise improved properties is obtained by this procedure.

In another embodiment, dripolene is separated into fractions by distillation, all or part of the fractions are subjected to a preliminary heat treatment at a temperature between about 350 and 650° F. in the absence of a catalyst for a period of 5 to 30 minutes or more, and the fractions are subjected to stepwise polymerization as set forth hereinabove.

The products of our invention are useful resins having superior properties with respect to softening point, color, viscosity, solubility in pentane, molecular weight, and indentation, compared with resins produced by the one-stage polymerization processes of the prior art. Our resins are especially desirable as raw materials for the fabrication of mastic floor tiles, in which application they are ordinarily combined with 30 to 40 percent of a plasticizer such as air-blown limed tall oil, lube oil extracts, and the like, and mixtures thereof.

Our invention will be more fully understood from the following specific examples.

*Examples*

A quantity of dripolene, prepared as described above, was fractionally distilled and between 80 and 85 volume-percent thereof was recovered as an overhead fraction. The said overhead fraction was thermally pretreated at 430° F. for approximately 17 minutes, and was divided into aliquots for further processing.

As a control, one aliquot was subjected to a single-step polymerization by contact with 6 weight-percent of AlCl3 in the form of a complex with xylene, the said complex containing 20 weight-percent of AlCl3. The polymerization mixture was agitated 1 hour at 35° C., and was thereafter neutralized with aqueous 40% sodium hydroxide. The organic layer was stratified and separated, and the product resin was recovered therefrom by stripping under vacuum. The results of this test and of comparative two-step polymerizations according to our invention are presented in the table below.

Another aliquot of the thermally pretreated dripolene overhead fraction was fractionally distilled into a 0-40 volume-percent overhead fraction and a 40-100 volume-percent bottoms fraction. The 40-100 volume-percent fraction was polymerized by agitation for one-half hour at 35° C. with a quantity of the aromatic complex of aluminum chloride, described above, equivalent to 5 weight-percent of AlCl3, based on the said fraction. Thereafter, the 0-40 volume-percent fraction was added, and agitation was continued for one-half hour at 35° C. The total catalyst employed was 3% AlCl3, based on the total charging stock. The reaction mixture was neutralized with aqueous 40% sodium hydroxide, and the resin was recovered from the organic layer by stripping under vacuum.

Three other aliquots of the said thermally pretreated dripolene overhead were fractionally distilled into 0-50, 0-60, and 0-70 volume-percent overhead fractions and corresponding bottoms fractions, and each pair of distillate and bottoms fractions was subjected to a two-stage polymerization under the conditions employed for the 0-40 and 40-100 volume-percent fractions.

The results of the foregoing tests, presented in the following table, demonstrate the superiority of our process when employed in the two-stage treatment of dripolene overhead fractions in the 0–40 to 0–60 volume-percent range with the corresponding bottoms fractions.

| Dripolene Fractions, vol.-percent: | One-step (control) | 40-100 0-40 | 50-100 0-50 | 60-100 0-60 | 70-100 0-70 | Spec.[a] |
|---|---|---|---|---|---|---|
| Step 1 | | | | | | |
| Step 2 | | | | | | |
| Catalyst conc'n, wt.-percent [b] | 6.0 | 3.0 | 3.0 | 3.0 | 3.0 | -------- |
| Resin wt., g | 570 | 1,206 | 630 | 595 | 605 | -------- |
| Resin yield, wt.-percent | 28.5 | 27.4 | 28.0 | 24.0 | 29.3 | -------- |
| Softening point, °F | 294 | 265 | 290 | 310 | 287 | -------- |
| Color, Cumar | 3.5 | 2.5 | 2.5 | 3 | 4.5 | -------- |
| Molecular wt | 800 | 750 | 934 | 1,148 | 1,050 | -------- |
| Iodine No | 115 | 107 | 112 | 113 | 110 | -------- |
| Viscosity, Gardner [c] | Z-5 | X | Z-5 | Z-6 | Z-1 | -------- |
| Indentation, mils: | | | | | | |
| 77° F., 1 min | 8.0 | 5.0 | 6.5 | 7.0 | 10.0 | 7.0 |
| 77° F., 10 min | 15.0 | 8.0 | 9.0 | 12.0 | 19.5 | 11.7 |
| 115° F., 30 sec | 48.0 | 41.0 | 25.8 | 34.0 | 67.0 | 38.0 |

[a] U. S. Government maximum indentation specifications for floor tiles.
[b] Proportion of AlCl$_3$, based on total charge.
[c] As 70% solution in toluene.

While we have described our invention with reference to certain specific embodiments thereof, it is to be understood that such embodiments are illustrative only and not by way of limitation. Various modifications of our invention and alternative operating procedures, techniques, and conditions will be apparent from the foregoing description to those skilled in the art.

In accordance with the foregoing description, we claim as our invention:

1. In a method for preparing a hydrocarbon resin by polymerization of dripolene, a normally liquid mixture of unsaturated hydrocarbons obtained in the pyrolysis of a normally gaseous hydrocarbon having at least two carbon atoms in the molecule at a temperature between about 1300 and 1550° F. and a contact time between about 0.2 and 5 seconds, the improvement which comprises separating dripolene into at least two fractions of differing degrees of unsaturation by fractional distillation, contacting the least unsaturated fraction obtained thereby with an aluminum chloride polymerization catalyst under polymerization conditions until polymerization thereof is substantially complete, successively adding thereto the other dripolene fraction or fractions in order of increasing unsaturation and subjecting the resulting mixtures after each such addition to polymerization conditions until polymerization thereof is substantially complete, whereby a hydrocarbon resin is produced, and recovering the said resin from the reaction product.

2. In a method for preparing a hydrocarbon resin by polymerization of dripolene, a normally liquid mixture of unsaturated hydrocarbons obtained in the pyrolysis of a normally gaseous hydrocarbon having at least two carbon atoms in the molecule at a temperature between about 1300 and 1550° F. and a contact time between about 0.2 and 5 seconds, the improvement which comprises separating dripolene by fractional distillation into a lower-boiling first fraction consisting of from 40 to 60 volume-percent of the said dripolene and a higher-boiling second fraction consisting of the remainder of the said dripolene, agitating the said second fraction with an aluminum chloride polymerization catalyst under polymerization conditions until polymerization thereof is substantially complete, then adding said first fraction to the reaction mixture and further agitating the said mixture under polymerization conditions to effect substantially complete polymerization thereof, separating said catalyst therefrom, and recovering a hydrocarbon resin from the reaction product.

3. In a method for preparing a hydrocarbon resin by polymerization of dripolene, a normally liquid mixture of unsaturated hydrocarbons obtained in the pyrolysis of a normally gaseous hydrocarbon having at least two carbon atoms in the molecule at a temperature between about 1300 and 1550° F. and a contact time between about 0.2 and 5 seconds, the improvement which comprises fractionally distilling dripolene into an overhead fraction consisting of about 40 to 60 volume-percent of the said dripolene and a bottoms fraction consisting of the remainder of the said dripolene, agitating said bottoms fraction with above about 2.5% by weight of AlCl$_3$ at a temperature between about 0 and 100° C. until polymerization thereof is substantially complete, adding thereto said overhead fraction and further agitating at a temperature between about 0 and 100° C. until the polymerization thereof is substantially completed, neutralizing said aluminum chloride catalyst, and recovering a synthetic hydrocarbon resin from the resulting organic layer by stripping low boilers therefrom.

4. In a method for preparing a hydrocarbon resin by polymerization of dripolene, a normally liquid mixture of unsaturated hydrocarbons obtained in the pyrolysis of a normally gaseous hydrocarbon having at least two carbon atoms in the molecule at a temperature between about 1300 and 1550° F. and a contact time between about 0.2 and 5 seconds, the improvement which comprises thermally pretreating dripolene at a temperature between about 350 and 650° F. for about 5 to 30 minutes, separating the pretreated dripolene by fractional distillation into an overhead fraction containing between about 40 and 60% thereof and a bottoms fraction consisting of the remainder thereof, commingling the resulting bottoms fraction with an aromatic complex of aluminum chloride containing between about 2.5 and 5% by weight of AlCl$_3$, based on said bottoms fraction, agitating the resulting mixture at a temperature between about 0 and 60° C. until the polymerization thereof is substantially complete, thereafter adding said overhead fraction thereto and further agitating at a temperature between about 0 and 60° C. until the polymerization is substantially complete, neutralizing the resulting reaction product with an aqueous caustic solution, stratifying and withdrawing an organic phase, and recovering a hydrocarbon resin from the said organic phase by stripping low boilers therefrom.

References Cited in the file of this patent

UNITED STATES PATENTS

| | | |
|---|---|---|
| 2,023,495 | Thomas | Dec. 10, 1935 |
| 2,100,900 | Fikentscher | Nov. 30, 1937 |
| 2,234,660 | Thomas | Mar. 11, 1941 |
| 2,583,504 | Young | Jan. 22, 1952 |